(12) United States Patent
Stoesz

(10) Patent No.: US 7,744,292 B2
(45) Date of Patent: Jun. 29, 2010

(54) OPTICAL FIBER LANDING INDICATOR WITH DISTRIBUTED TEMPERATURE SENSOR CALIBRATION

(75) Inventor: Carl W. Stoesz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/833,000

(22) Filed: Aug. 2, 2007

(65) Prior Publication Data

US 2009/0033331 A1 Feb. 5, 2009

(51) Int. Cl.
G02B 6/36 (2006.01)
(52) U.S. Cl. .......................................... 385/92; 385/88
(58) Field of Classification Search .................. 385/88, 385/92, 94; 166/66, 242.6, 242.7
See application file for complete search history.

(56) References Cited

U.S. PATENT DOCUMENTS

| | | | | |
|---|---|---|---|---|
| 6,511,231 | B2 * | 1/2003 | Lampert et al. | 385/70 |
| 7,640,977 | B2 * | 1/2010 | Jonas | 166/242.6 |
| 2003/0042019 | A1 | 3/2003 | Harkins et al. | |
| 2003/0059171 | A1 | 3/2003 | Pfleger | |

2005/0211441 A1 9/2005 Vold et al.

FOREIGN PATENT DOCUMENTS

| | | |
|---|---|---|
| GB | 2404938 A | 2/2005 |
| WO | 9812588 | 3/1998 |
| WO | 0206625 A1 | 1/2002 |

OTHER PUBLICATIONS

Colin Smithpeter, Randy Normann, James Krumhansl, Dick Benoit, Steve Thompson, "Evaluation of a distributed fiber-optic temperature sensor for logging wellbore temperature at the beowawe and dixie valley geothermal fields", Twenty-fourth workshop on geothermal reservoir engineering, Stanford University, Stanford, CA, Jan. 25-27, 1999, 99 1-9.
International Searching Authority, International Search Report and Written Opinion, Mailed on Oct. 20, 2008, International Search Report 7 pages, Written Opinion 6 pages.

* cited by examiner

*Primary Examiner*—Uyen-Chau N Le
*Assistant Examiner*—John M Bedtelyon
(74) *Attorney, Agent, or Firm*—Cantor Colburn LLP

(57) ABSTRACT

An optic fiber cable landing indicator includes a housing; a landing head receptive to an optic fiber cable plug and translatable within the housing; and an electronics module at the housing and responsive to movement of the landing head to initiate a signal readable at a remote location confirming landing of the optic fiber cable and method to confirm fiber optic landing.

21 Claims, 2 Drawing Sheets

OPTICAL FIBER LANDING INDICATOR WITH DISTRIBUTED TEMPERATURE SENSOR CALIBRATION

BACKGROUND

In the hydrocarbon industry, running optic fiber cables into a wellbore is becoming a more common occurrence. In some instances, optic fiber cables are appended to tools prior to being run in the hole, however, there are also means for running optic fibers down the wellbore after tools are prepositioned. In such instances, fibers or cables are run down into the hole and then connected in one way or another in the downhole environment. Improvements to all such connection means are always well received by the industry.

SUMMARY

An optic fiber cable landing indicator includes a housing; a landing head receptive to an optic fiber cable plug and translatable within the housing; and an electronics module at the housing and responsive to movement of the landing head to initiate a signal readable at a remote location confirming landing of the optic fiber cable.

A method to confirm optic fiber cable landing in a landing indicator includes pumping and optic fiber cable into fluid flow inhibiting communication with a landing head of the landing indicator; applying fluid pressure to the landing head to urge the same to activate a switch; and causing a signal to be receivable at a remote location confirming the foregoing.

BRIEF DESCRIPTION OF THE DRAWINGS

Referring now to the drawings wherein like elements are numbered alike in the several figures.

DETAILED DESCRIPTION

Optic fibers and optic fiber cables that are run into the wellbore for subsequent connection in the downhole environment can be difficult to verify with respect to positioning appropriately downhole. Moreover, sensory readings taken from such cables are sometimes suspect due to questionable calibration. Despite these drawbacks, fiber is a popular alternative to more conventional means of monitoring and control due to the enhanced performance fiber represents. While it has not been apparent to the industry that there is a problem with the running and calibration of optic fiber cables, the present inventors have invented an improved system.

Elements of an embodiment of the invention are first broadly identified herein in order to enhance understanding of the present disclosure during the following discussion of the operation of the device in the second portion of this application. A schematic cross-sectional illustration is used in a series of positions in sequential FIGS. 1-4 to graphically assist the written disclosure. In each of the figures both the optical fiber landing indicator 10 and an optical fiber or cable 12 are shown as they are moved relative to each other in use.

DETAILED DESCRIPTION

Figure 1:
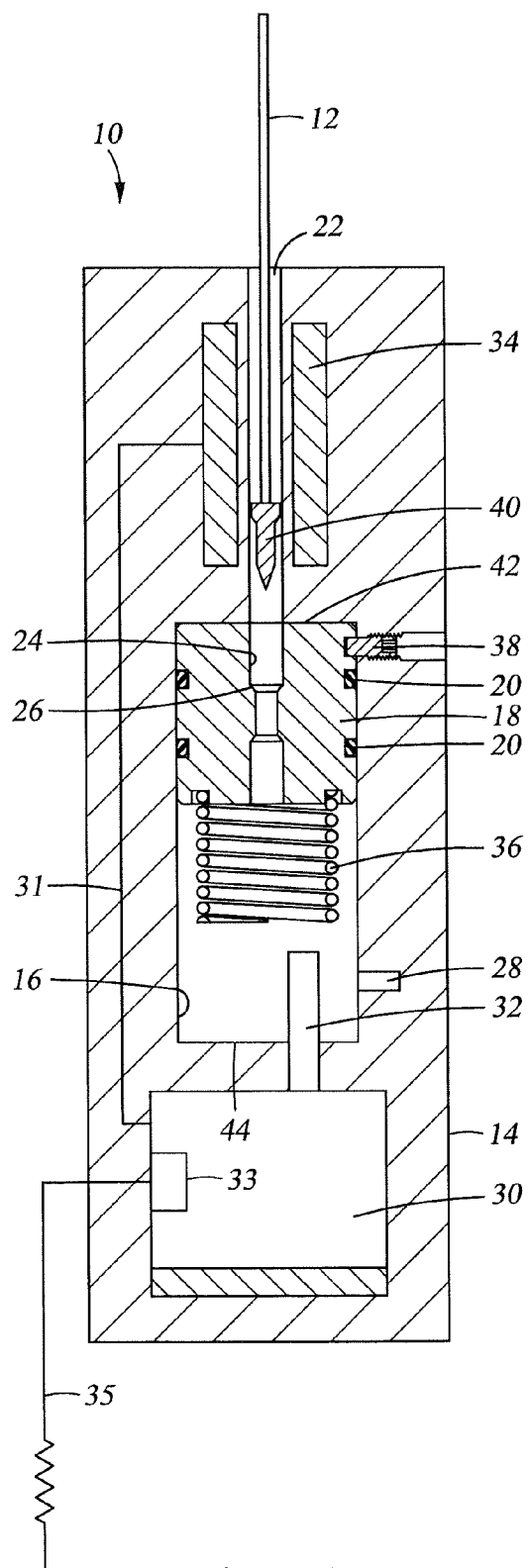
FIG. 1 is a schematic cross-sectional illustration of one embodiment of the optical fiber landing indicator.
Figure 2:
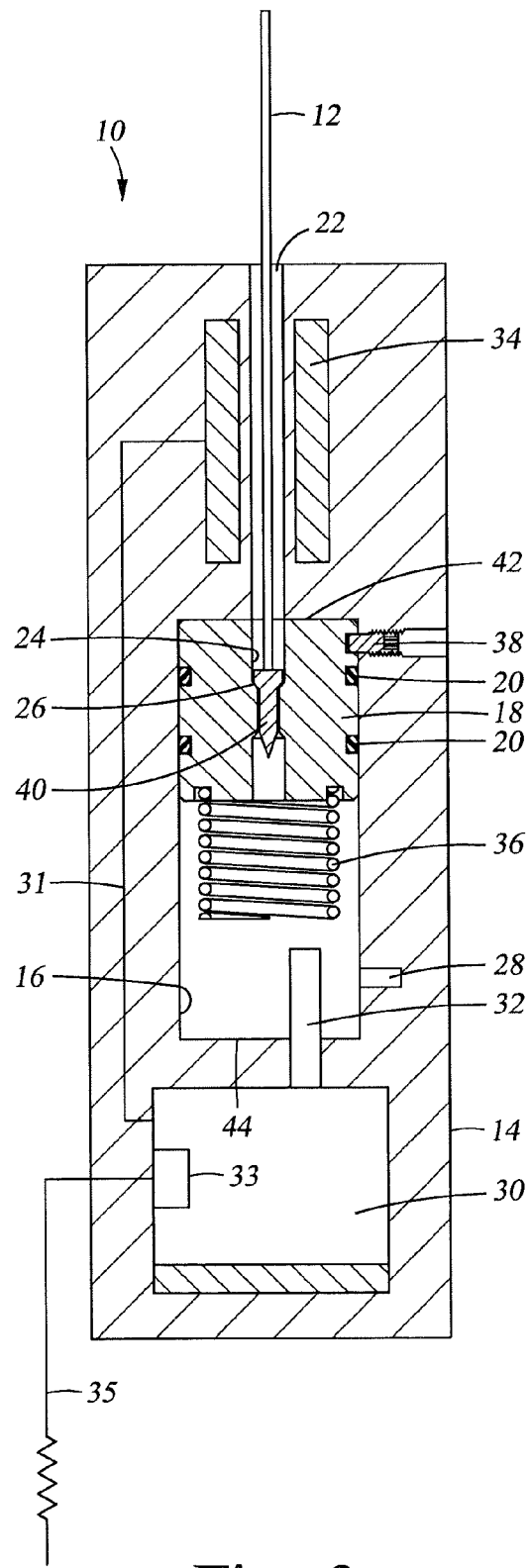
FIG. 2 is the indicator depicted in FIG. 1 in a different position.
Figure 3:
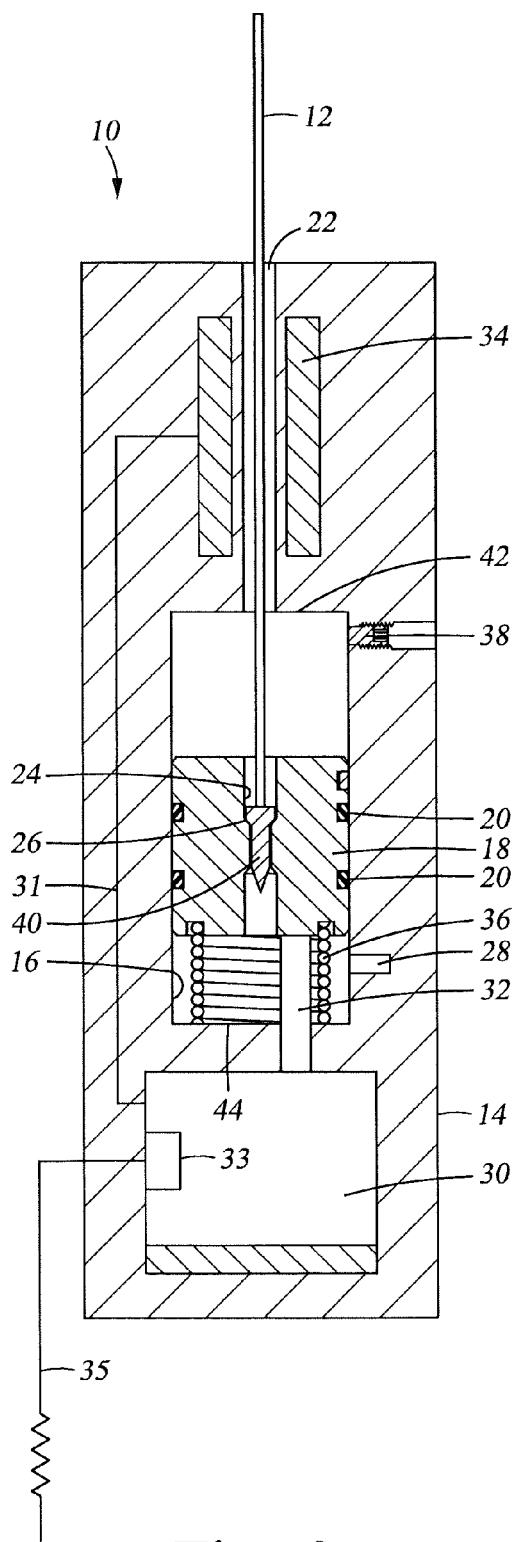
FIG. 3 is the indicator depicted in FIG. 1 in another different position.
Figure 4:
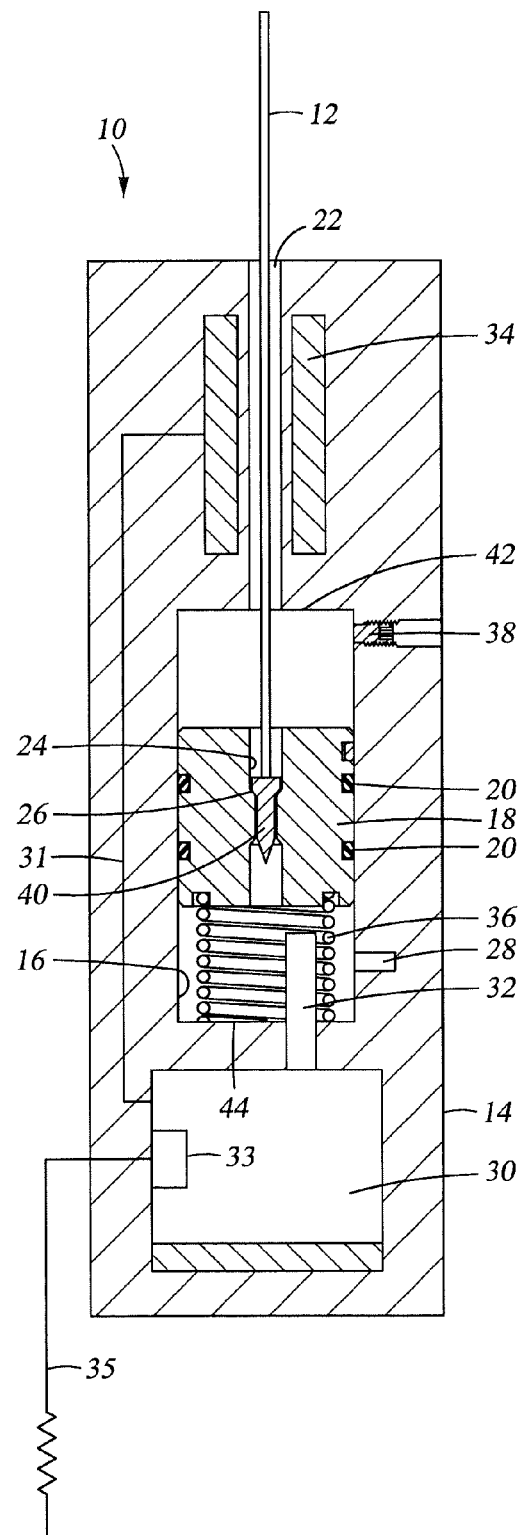
FIG. 4 is the indicator depicted in FIG. 1 in a final position.

Referring to FIG. 1, the indicator 10 comprises a housing 14 defining a cylinder bore 16 within which is located a landing head 18 having at least one (two illustrated) seal 20. The landing head 18 is translatable within the cylinder bore 16 under particular conditions discussed hereunder. The landing head 18, in this embodiment has three distinct positions: an initial position (FIGS. 1 and 2), a switch position (FIG. 3) and a rest position (FIG. 4). These will all become more clear in the below discussion of operation of the indicator. Facilitating operation of the indicator is an optic fiber cable opening 22, a through passage 24 in the landing head, the through passage having a landing seat 26 for the optic fiber cable and a fluid return port 28. The optic fiber cable opening 22, through passage 24, cylinder bore 16 and fluid return port 28 define a fluid flow circuit, the manipulation of which is used to install the cable 12 and operate the indicator 10. Further included is an electronics module 30 mounted at the housing 14. The electronics module 30 is responsive to the activation of a switch 32 operably connected illustrated with line 31 thereto. As illustrated, the switch 32 is a momentary switch responsive to direct load thereon but it is to be appreciated that any type of switch could be substituted such as an electrical switch, an optical switch, a fully mechanical switch, etc. providing that the switch 32 can be activated by the movement of the landing head 18. The electronics module 30 is further to include a telemetry arrangement that may be acoustically based, electrically based or for example may be stress based such as by employing a stress inducer 34. The stress inducer 34 may be a heater (as illustrated), may be a device to physically deform the optic fiber, or may be some other stress inducer that an optic fiber is sensitive to such that monitoring optic signals on the fiber will reveal the stress at a remote location. Monitoring these signals is used for confirmation of landing and for calibration of the fiber. Either or both of these functions may be employed in particular applications. The stress inducer 34 is actuated by the electronics module 30 in response to the switch 32 being activated by the landing head 18. Penultimately, the components of the indicator as illustrated, include a biasing member 36 disposed in the cylinder bore 16 so that the landing head 18 can be biased out of the position necessary to activate the switch 32 and into the rest position (FIG. 4). Finally the indicator 10 includes a release mechanism 38, which is provided to maintain the landing head in the initial position (FIGS. 1 and 2) until it is desired that the landing head begin moving.

The indicator 10 is best understood through a discussion of its operation with reference to FIGS. 1-4 in sequence. Referring to FIG. 1, the optic fiber cable 12 is illustrated, having begun to penetrate opening 22 on its way to seating within landing head 18. To improve the function of the seating of cable 12 in landing head 18, it is to be noted that the cable 12 includes a plug 40 that is configured to nest with landing seat 26, which, in the illustrated embodiment, is a restriction in the through passage 24 of landing head 18. Plug 40 is larger in outside dimension than that of restriction (landing seat) 26, meaning that while fluid may pass through landing seat 26 during pumping of the fiber-optic cable 12 into the downhole environment, fluid flow through landing head 18 will substantially stop upon the landing of plug 40 in seat 26. At this point, pressure may be increased within the opening 22 (applied from a remote location such as the surface (not shown)). As pressure rises, a load on the release mechanism 38 will at a predetermined load exceed the load holding capacity of the release mechanism 38. As illustrated, the release mechanism is a shear screw that will shear at the predetermined shear load to then allow the landing head 18 to move within cylinder bore 16. It should be noted that while the screw is illustrated, any release mechanism might be substituted. Upon release of the release mechanism 38, landing head 18 is urged by the same fluid pressure that caused the release to move from its initial position adjacent an inlet end 42 of cylinder bore 16 (see FIGS. 2 and 3 for this transition) toward an opposite end 44 of cylinder bore 16. Because fluid fills the cylinder bore 16 between landing head 18 and end 44, the fluid must be exhausted, which is accomplished by fluid return port 28. In the FIG. 3 position, it will be noted that the landing head 18 has moved fully toward end 44 and biasing member 36 is compressed. The switch 32 is thus in an activated position. It is noted that while switch 32 is illustrated as directly in contact with electronics module 16, this is not necessarily required. All that is required is that a switch mechanism be provided that is responsive to movement of the landing head 32 at a predetermined position and is capable of signaling that response to the electronics module 30. Upon activation of switch 32, the electronics module 30 will send a signal that may be directly to a remote location such as the surface or that will initiate another device to take an action that will result in that signal being received at the remote location (one embodiment is discussed in more detail below). Once the signal is received, pressure may be reduced or eliminated from the opening 22 thereby allowing the biasing member 38 to become the dominant actor on the landing head 18 and push the landing head 18 to a position where it is no longer activating switch 32 (the rest position of FIG. 4).

With the indicator 10 configured as illustrated, several things become apparent to the operator: Upon landing of the plug 40 in landing seat 26, the fluid pressure at opening 22 (and of course whatever tubing supplies the pressure creating fluid to the opening 22) rises. This is detectable at the surface and serves as a first indicator of landing. Due to potential restrictions in the tubing, this is not a definitive indication of landing but is one noted event. Once the pressure is high enough to cause release of the release member 26, the pressure will momentarily drop while the landing head moves toward end 44. Pressure will again begin to rise as biasing member 36, illustrated as a spring, is compressed and the switch 32 is activated. Pressure will remain steady and be held so from the remote location until the signal is received from the indicator 10 confirming landing. Confirmation of landing is as note above given either directly by the electronics module 30 or by another device that the module 30 actuates. In the illustrated embodiment, the actuated device is the stress inducer 34. In this embodiment the stress inducer 34 is a heater. The electronics module 30 powers the heater either by an integral power source such as a battery or generator 33 or feeds power to the heater from a remote power source 35. Upon the heater heating, the optic fiber (routed in close proximity thereto) is affected by the heat stress. Since in this embodiment, the electronics module 30 is configured to maintain a particular predetermined heat signature that is known in advance, the change in the frequency of light passing through the fiber can be used for either or both of confirming landing and calibrating the fiber. Once confirmation and calibration are finished, pressure in the system is reduced or eliminated and the biasing member 36 caused the landing head 18 to stop activating the switch 32.

Indicator 10 has at this point, completed its initial operation to confirm landing of optic fiber cable 12 and to enable calibration thereof. It is also to be noted that the indicator 10 can again be used in order to recalibrate optic fiber cable 12 in the event of temperature drift over time. If readings from the fiber optic cable 12 subsequent to initial calibration become suspect, the indicator 10 can again be used to recalibrate the optic fiber cable. All that is required to recalibrate the optic fiber cable 12 is to repressurize the opening 22 of the indicator 10. This will again urge landing head 18 to compress spring 36 and activate switch 32. Upon activating of switch 32 the sequence discussed above will recur thereby stressing the cable 12. The frequency with which recalibrations can be done is limited only by available power. In the event a battery pack is utilized in the electronics module 30, clearly there will be a finite number of recalibrations possible, however, since it is contemplated to provide redundant or different power sources that may not be limited in time, potentially unlimited recalibrations are possible.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A downhole optic fiber cable landing indicator comprising:
    a housing;
    a landing head sealably receptive to an optic fiber cable plug and configured to be translatable within the housing in response to pressure acting thereagainst; and
    an electronics module at the housing and responsive to movement of the landing head to initiate a signal readable at a remote location confirming landing of the optic fiber cable.

2. The downhole optic fiber cable landing indicator as claimed in claim 1 wherein the landing head is fluid sealably mounted within a cylinder bore of the housing.

3. The downhole optic fiber cable landing indicator as claimed in claim 1 wherein the electronics module includes a power source.

4. The downhole optic fiber cable landing indicator as claimed in claim 3 wherein the power source is a battery.

5. The downhole optic fiber cable landing indicator as claimed in claim 1 wherein the electronics module is triggered by a switch actuated by the landing head.

6. The optic fiber cable landing indicator as claimed in claim 5 wherein the switch is a mechanical switch.

7. The downhole optic fiber cable landing indicator as claimed in claim 5 wherein the switch is an electrical switch.

8. The optic fiber cable landing indicator as claimed in claim 5 wherein the switch is an optical switch.

9. The downhole optic fiber cable landing indicator as claimed in claim 1 wherein the signal initiated is an electrical signal.

10. The optic fiber cable landing indicator as claimed in claim 1 wherein the signal initiated is an optical signal.

11. The optic fiber cable landing indicator as claimed in claim 1 wherein the signal initiated is an acoustic signal.

12. The downhole optic fiber cable landing indicator as claimed in claim 1 wherein the indicator further includes a biasing member in operable communication with the landing head to bias the landing head out of engagement with a switch of the electronics module.

13. The downhole optic fiber cable landing indicator as claimed in claim 1 wherein the indicator further includes a release mechanism to releasably retain the landing head in a desired initial position.

14. The downhole optic fiber cable landing indicator as claimed in claim 13 wherein the release mechanism is at least one shear screw.

15. The downhole optic fiber cable landing indicator as claimed in claim 1 wherein the indicator further includes a stress inducer responsive to actuation by the electronics module and positioned to interact with an optic fiber cable landing in the landing indicator.

16. The downhole optic fiber cable landing indicator as claimed in claim 15 wherein the stress inducer is a heater.

17. The optic fiber cable landing indicator as claimed in claim 15 wherein the stress inducer is a compressor.

18. The downhole optic fiber cable landing indicator as claimed in claim 15 wherein the stress inducer, during use, imposes upon the optic fiber a known condition to enable calibration of the optic fiber at a remote location.

19. The downhole optic fiber cable landing indicator as claimed in claim 1 wherein the landing head is configured to allow fluid passage therethrough prior to being sealably engaged by the optic fiber cable plug.

20. The downhole optic fiber cable landing indicator as claimed in claim 1 wherein the landing head is configured to maintain a pressure drop thereacross when sealingly engaged with the optic fiber cable plug.

21. The downhole optic fiber cable landing indicator as claimed in claim 1 wherein the landing head is retained within the housing independent of engagement of the optic fiber cable plug therewith.

* * * * *